(12) United States Patent
Stecewycz

(10) Patent No.: US 12,476,395 B2
(45) Date of Patent: Nov. 18, 2025

(54) JUMP STARTING SYSTEMS WITH ELECTRICAL JUMPER PLUGS

(71) Applicant: Joseph Stecewycz, Groton, MA (US)

(72) Inventor: Joseph Stecewycz, Groton, MA (US)

(73) Assignee: Cytherean Mandelbrot LLC, Groton, MA (US)

( * ) Notice: Subject to any disclaimer, the term of this patent is extended or adjusted under 35 U.S.C. 154(b) by 221 days.

(21) Appl. No.: 18/210,616

(22) Filed: Jun. 15, 2023

(65) Prior Publication Data

US 2023/0335926 A1  Oct. 19, 2023

Related U.S. Application Data

(63) Continuation-in-part of application No. 17/958,326, filed on Oct. 1, 2022, and a continuation-in-part of application No. 17/734,107, filed on May 1, 2022.

(60) Provisional application No. 63/352,835, filed on Jun. 16, 2022.

(51) Int. Cl.
| | |
|---|---|
| *H02J 7/00* | (2006.01) |
| *H01R 11/24* | (2006.01) |
| *H01R 11/28* | (2006.01) |
| *H02J 1/10* | (2006.01) |
| *H02J 7/14* | (2006.01) |

(52) U.S. Cl.
CPC ........... *H01R 11/288* (2013.01); *H01R 11/24* (2013.01); *H02J 1/122* (2020.01); *H01R 2201/26* (2013.01)

(58) Field of Classification Search
CPC ......... H01R 11/00; H01R 11/18; H01R 11/29; H01R 11/28; H01R 11/281; H01R 11/285; H01R 11/288; H01R 11/289; H01R 11/39; H01R 11/32; H02J 1/22
USPC .......................................................... 320/134
See application file for complete search history.

(56) References Cited

U.S. PATENT DOCUMENTS

| | | | | |
|---|---|---|---|---|
| 3,466,453 | A | * | 9/1969 | Greenberg ............... B60D 1/62 |
| | | | | 320/DIG. 15 |
| 3,625,774 | A | * | 12/1971 | Rodgers ............... H01R 11/287 |
| | | | | 439/500 |
| 4,637,965 | A | * | 1/1987 | Davis ................... H01R 11/287 |
| | | | | 429/178 |
| 4,693,949 | A | * | 9/1987 | Kellett ................ H01M 50/591 |
| | | | | 429/179 |
| 4,885,524 | A | * | 12/1989 | Wilburn ................ H01M 50/55 |
| | | | | 320/DIG. 15 |
| 5,725,399 | A | * | 3/1998 | Albiez ................... H01H 39/00 |
| | | | | 439/923 |
| 5,804,770 | A | * | 9/1998 | Tanaka ................ H01M 50/591 |
| | | | | 174/138 F |
| 5,921,809 | A | * | 7/1999 | Fink ..................... H01R 11/289 |
| | | | | 439/679 |
| 6,147,471 | A | * | 11/2000 | Hunter ................. H01R 11/287 |
| | | | | 320/105 |

(Continued)

*Primary Examiner* — Alexis B Pacheco
(74) *Attorney, Agent, or Firm* — Joseph Stecewycz

(57) ABSTRACT

The invention is a jump starting system for conducting a charging operation with various combinations of two automotive batteries in which one or both batteries is either a conventional battery, a battery with embossed electrical contact sockets, or a battery with internal electrical contact slots, where electrical connection between batteries is established by means of a battery jumper plug cable having four electrical jumper plugs electrically attached to respective ends of a positive insulated conductor and a negative insulated conductor.

20 Claims, 11 Drawing Sheets

(56) References Cited

U.S. PATENT DOCUMENTS

| | | | | |
|---|---|---|---|---|
| 7,481,660 | B1* | 1/2009 | Tsai | H01R 31/065 |
| | | | | 439/651 |
| 9,368,912 | B1* | 6/2016 | Sullivan | H01R 11/288 |
| 9,755,392 | B2* | 9/2017 | Hennessy | H01R 43/26 |
| 9,929,478 | B1* | 3/2018 | Bellete | H01R 13/11 |
| 2004/0145340 | A1* | 7/2004 | Horenstein | H01R 24/84 |
| | | | | 320/105 |
| 2007/0143990 | A1* | 6/2007 | Larkin | H01R 43/20 |
| | | | | 29/748 |
| 2011/0262806 | A1* | 10/2011 | Balzan | H01M 50/184 |
| | | | | 429/211 |
| 2015/0280336 | A1* | 10/2015 | Itou | H01M 50/505 |
| | | | | 439/625 |
| 2017/0222462 | A1* | 8/2017 | Green | H01R 11/288 |
| 2018/0076438 | A1* | 3/2018 | DeKeuster | H01M 50/553 |
| 2020/0169114 | A1* | 5/2020 | Almeida | B60R 16/04 |
| 2021/0135409 | A1* | 5/2021 | Hsu | H01R 35/04 |
| 2023/0327464 | A1* | 10/2023 | Huang | H01M 10/44 |
| | | | | 320/150 |
| 2024/0380138 | A1* | 11/2024 | Yabase | H01R 11/284 |

* cited by examiner

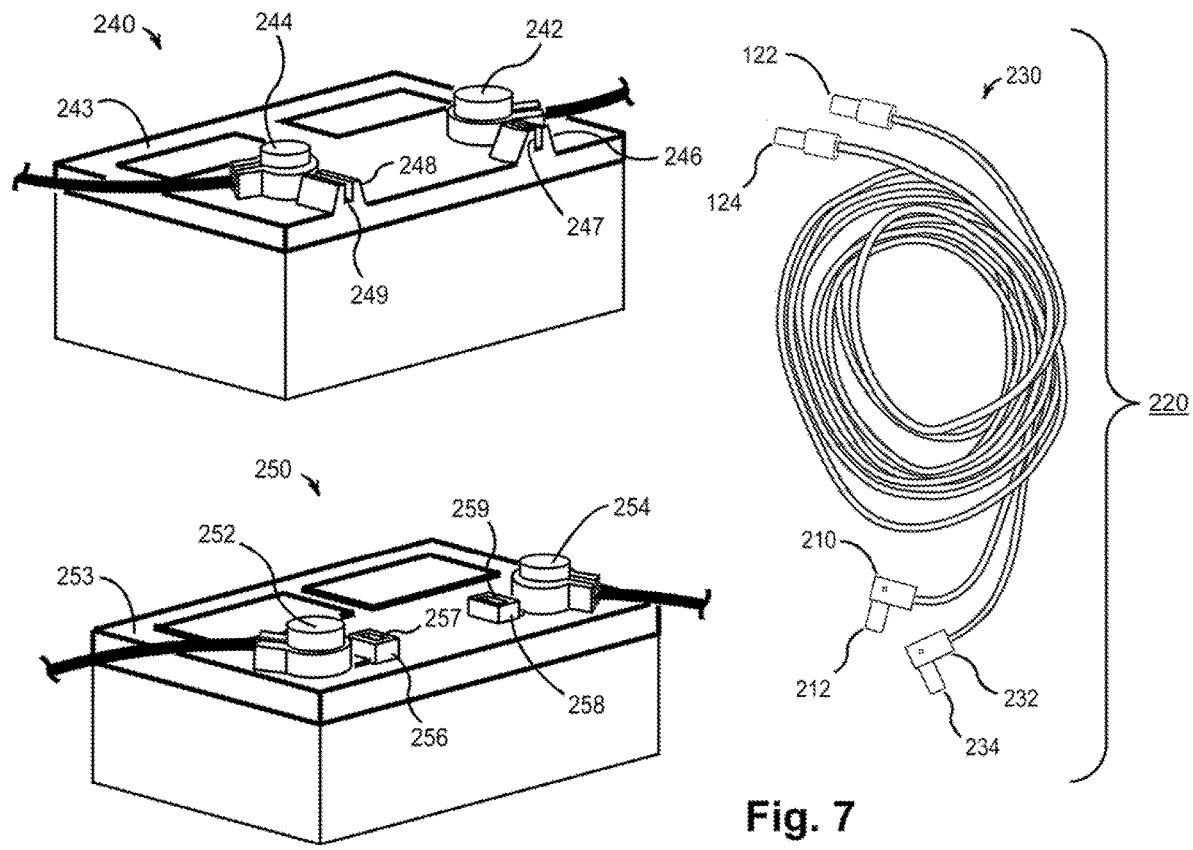
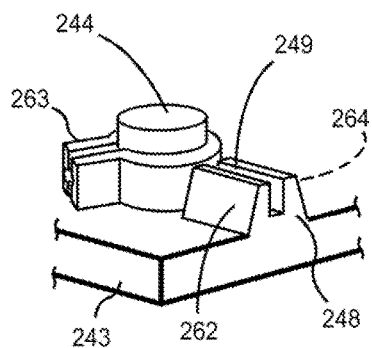
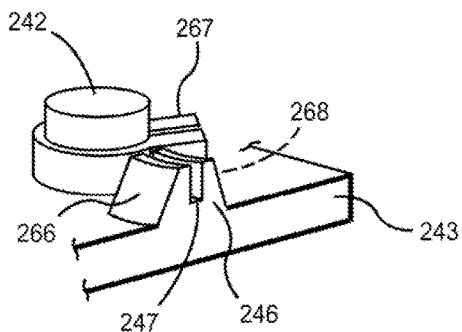
Fig. 7
Fig. 8
Fig. 9

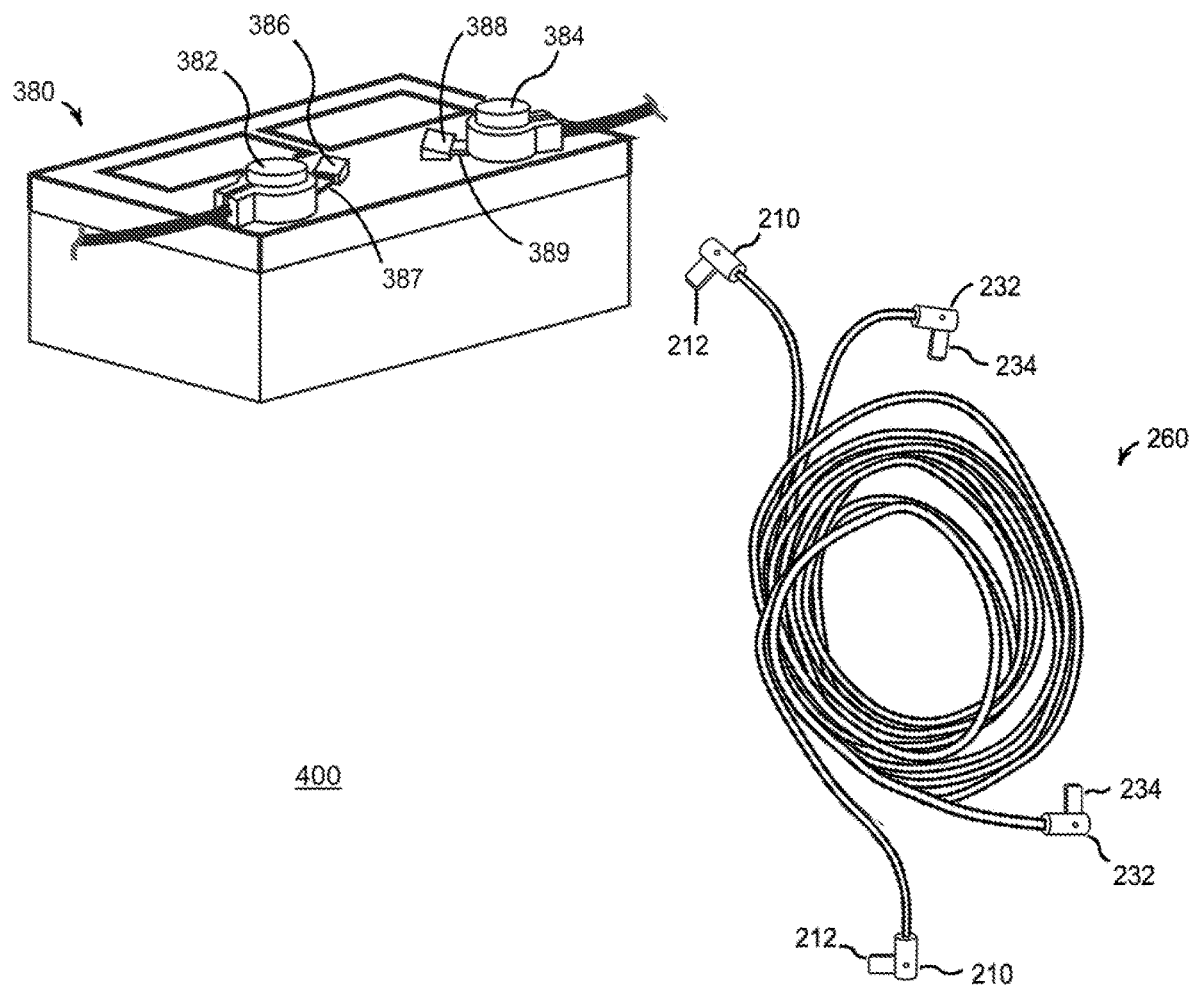
Fig. 18
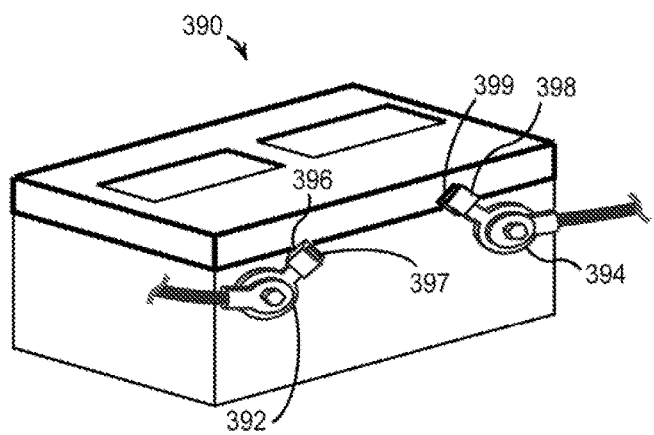

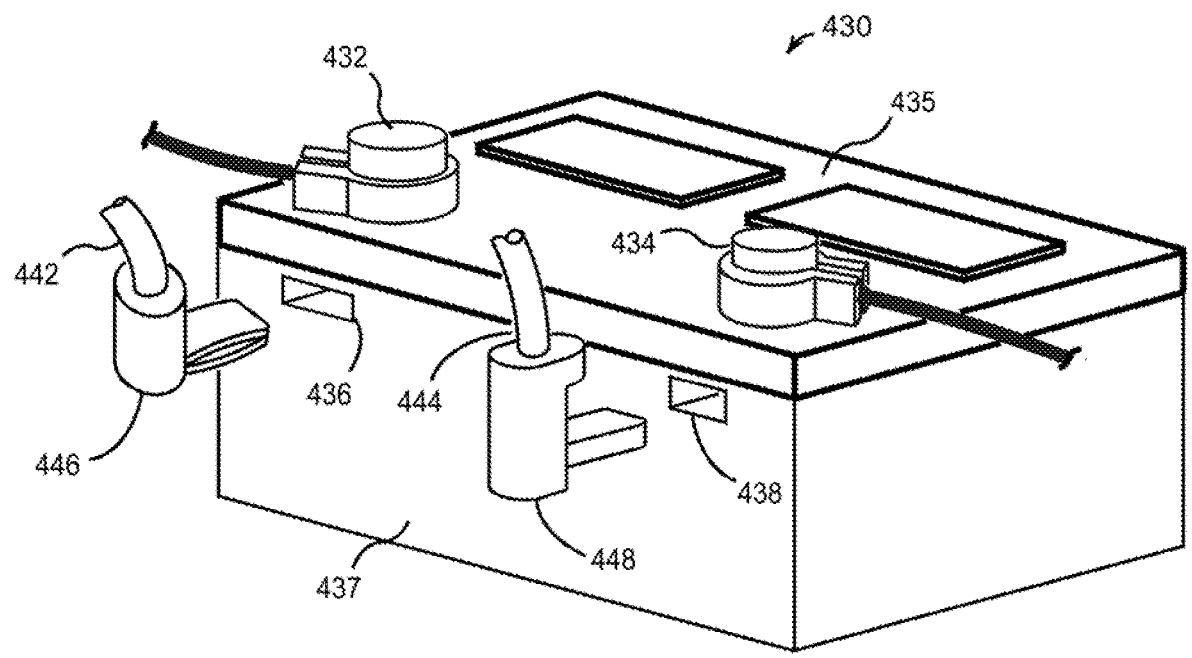
Fig. 22
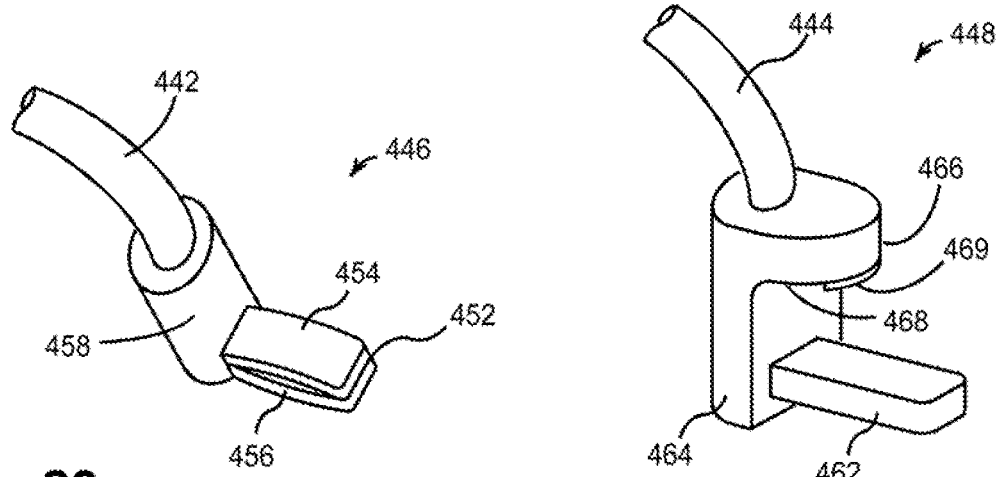
Fig. 23
Fig. 24

JUMP STARTING SYSTEMS WITH ELECTRICAL JUMPER PLUGS

FIELD OF THE INVENTION

This invention generally relates to systems and methods for charging and jump starting automobile batteries by using a battery jumper plug cable for providing electrical connection between batteries with or without internal electrical contact slots, and batteries with or without external embossed battery contact sockets.

BACKGROUND OF THE INVENTION

Conventional jump starting cables suffer from the shortcoming that the serrated jaws of booster cable clamps produce indentations and scratches on the softer lead alloy battery terminals or on lead alloy engine battery terminal clamps secured to the battery terminals. Over time, clamping and unclamping jump starting cables produces deterioration of the lead alloy surfaces, especially when a user twists and turns booster cable clamps to improve an electrical connection.

Another shortcoming is that the conventional booster cable clamp may accidentally make contact with the vehicle chassis or metal engine components when jump starting. A further shortcoming is that the process of connecting the booster cable typically requires the use of both hands to prevent the booster cable clamps from accidentally contacting each other. Proper emplacement of the booster cable clamps is particularly challenging in a densely populated engine compartment. Additionally, there is a finite probability that an electrical spark may ignite hydrogen gas produced by battery overcharging. Perhaps the most glaring drawback of using booster cable clamps is that conventional clamps are substantially physically identical in size and shape, lacking any polarization distinction except for standard red and black colors commonly used for the clamp handles, a distinction which may be difficult to perceive under poor lighting conditions.

What is needed is a battery charging apparatus that overcomes the limitations of the prior art by: (i) providing a method of electrically connecting automotive batteries without causing surface damage to battery terminals and to battery clamps, (ii) assuring proper polarity when connecting a source battery to a discharged battery, and (iii) preventing generation of electrical sparks that may cause hydrogen gas ignition.

BRIEF SUMMARY OF THE INVENTION

The invention results from the observation that interconnecting automotive batteries for the purpose of charging can be achieved by utilizing jumper cable electrical contact plugs to provide electrical connections among: (i) internal electrical contact slots terminating at battery posts inside the battery housing; (ii) external electrical contact sockets embossed on the battery housing surface adjacent to battery terminals; and (iii) electrical contact slots in battery lug sockets, in a novel battery transverse clamp, or in a novel battery clamp, each of which removably attach to battery terminals.

In an aspect of the present invention, a jump starting system for use in conducting a charging operation with a conventional automotive battery includes a battery jumper plug cable, the battery jumper plug cable including a positive insulated electrical conductor and a negative insulated electrical conductor, the positive insulated electrical conductor having a first positive electrical jumper plug attached to a first positive electrical conductor end and a second positive electrical jumper plug attached to a second positive electrical conductor end, the negative insulated electrical conductor having a first negative electrical jumper plug attached to a first negative electrical conductor end and a second negative electrical jumper plug attached to a second negative electrical conductor end; a source battery having a positive battery contact socket embossed on a battery housing adjacent to a positive battery terminal, the positive battery contact socket configured as a mesa enclosing a positive electrical contact slot, the positive electrical contact slot configured to allow insertion of the first positive electrical jumper plug, and a negative battery contact socket embossed on the battery housing adjacent to a negative battery terminal, the negative battery contact socket configured as a mesa enclosing a negative electrical contact slot, the negative electrical contact slot configured to allow insertion of the first negative electrical jumper plug; a positive battery lug socket, the positive battery lug socket including a positive battery socket shell with a positive socket shell opening extending into the positive battery socket shell, the positive battery lug socket also having a positive electrically conductive lead configured to electrically contact a conventional automotive positive battery terminal, the positive electrically conductive lead secured in the positive socket shell such that a positive lead end is exposed at the positive socket shell opening to form a positive battery lug electrical contact slot; and, a negative battery lug socket, the negative battery lug socket including a negative battery socket shell with a negative socket shell opening extending into the negative battery socket shell, the negative battery lug socket having a negative electrically conductive lead configured to electrically contact a conventional automotive negative battery terminal, the negative electrically conductive lead secured in the negative socket shell such that a negative lead end is exposed in the negative socket shell opening to form a negative battery lug electrical contact slot; whereby, insertion of the first positive electrical jumper plug into the positive electrical contact slot, insertion of the first negative electrical jumper plug into the negative electrical contact slot, insertion of the second positive electrical jumper plug into the positive battery lug electrical contact slot, and insertion of the second negative electrical jumper plug into the negative battery lug electrical contact slot function to electrically connect the source battery with the conventional automotive battery for conducting the charging operation.

In another aspect of the present invention, a jump starting system for use in conducting a charging operation with a conventional automotive battery includes a source battery having a positive battery channel socket embossed on a battery housing adjacent to a first positive battery terminal, the positive battery channel socket configured as a mesa with a nonlinear channel forming a positive electrical contact open slot, and a negative battery channel socket embossed on the battery housing adjacent to a first negative battery terminal, the negative battery channel socket configured as a mesa with a linear channel forming a negative electrical contact open slot; a battery jumper plug cable, the battery jumper plug cable including a positive insulated electrical conductor and a negative insulated electrical conductor, the positive insulated electrical conductor having a first positive electrical jumper plug attached to a first positive electrical conductor end and a second positive electrical jumper plug attached to a second positive electrical conductor end, the negative insulated electrical conductor having a first negative electrical jumper plug attached to a first negative electrical conductor end and a second negative electrical jumper plug attached to a second negative electrical conductor end, the first positive electrical jumper plug having a first positive electrical prong configured for insertion into the positive electrical contact open slot, the first negative electrical jumper plug having a first negative electrical prong configured for insertion into the negative electrical contact open slot; a positive battery lug socket, the positive battery lug socket including a positive battery socket shell with a positive socket shell opening extending into the positive battery socket shell, the positive battery lug socket also having a positive electrically conductive lead configured to electrically contact a conventional automotive positive battery terminal, the positive electrically conductive lead secured in the positive socket shell opening to form a positive battery lug electrical contact slot; and, a negative battery lug socket, the negative battery lug socket including a negative battery socket shell with a negative socket shell opening extending into the negative battery socket shell, the negative battery lug socket also having a negative electrically conductive lead configured to electrically contact a conventional automotive negative battery terminal, the negative electrically conductive lead secured in the negative socket shell opening to form a negative battery lug electrical contact slot; whereby, insertion of the first positive electrical jumper plug into the positive electrical contact open slot, insertion of the first negative electrical jumper plug into the negative electrical contact open slot, insertion of the second positive electrical jumper plug into the positive battery lug electrical contact slot, and insertion of the second negative electrical jumper plug into the negative battery lug electrical contact slot function to electrically connect the source battery with the conventional automotive battery for conducting the charging operation.

In yet another aspect of the present invention, a jump starting system for use with two conventional automotive batteries in conducting a charging operation includes a battery jumper plug cable, the battery jumper plug cable including a positive insulated electrical conductor and a negative insulated electrical conductor, the positive insulated electrical conductor having a first dual prong jumper plug electrically connected to a first positive conductor end and a second dual prong jumper plug electrically connected to a second positive conductor end, the negative insulated electrical conductor having the first dual prong jumper plug electrically connected to a first negative conductor end and the second dual prong jumper plug electrically connected to a second negative conductor end; a battery transverse clamp, the battery transverse clamp for electrically contacting both a positive battery terminal and a negative battery terminal on a first conventional automotive battery, the battery transverse clamp including a first positive electrical contact opening providing access to a positive electrical conductive path to the positive battery terminal, the battery transverse clamp further including a first negative electrical contact opening providing access to a negative electrical conductive path to the negative battery terminal; and a battery clamp, the battery clamp having a positive terminal contact pad configured to make electrical contact with a positive automotive battery clamp on a second conventional automotive battery, the battery clamp further including a battery clamp electrical receptacle with a second positive electrical contact opening, the second positive electrical contact opening providing an electrical conductive path to the positive terminal contact pad, the battery clamp also having a negative terminal contact pad configured to make electrical contact with a negative automotive battery clamp on the second conventional automotive battery, the battery clamp electrical receptacle further including a second negative electrical contact opening providing an electrical conductive path to the negative terminal contact pad; whereby insertion of the first dual prong jumper plug into the battery transverse clamp, and insertion of the second dual prong jumper plug into the battery clamp electrical receptacle function to electrically connect the first conventional automotive battery with the second conventional automotive battery for conducting the charging operation.

The additional features and advantage of the disclosed invention is set forth in the detailed description which follows, and will be apparent to those skilled in the art from the description or recognized by practicing the invention as described, together with the claims and appended drawings.

BRIEF DESCRIPTION OF THE DRAWINGS

The uses and advantages of the present invention will be more fully appreciated as the same becomes better understood from the following detailed description of the present invention when viewed in conjunction with the accompanying Figures, in which:

FIG. 7 is a diagrammatical illustration of a jump starting system showing a battery jumper plug cable used to conduct an electrical charging current provided by a charged battery, with embossed channel contact sockets, to a drained battery with external battery contact sockets, in accordance with the present invention;

FIG. 8 is a detail view of the negative battery channel socket on the charged battery of FIG. 7;

FIG. 9 is a detail view of the positive battery channel socket on the charged battery of FIG. 7;

FIG. 18 is a diagrammatical illustration of a jump starting system showing a jumper plug cable used to conduct an electrical charging current from a charged battery with electrical contact sockets on a battery cover, to a drained battery with electrical contact sockets connected to battery side terminals, in accordance with the present invention;

FIG. 22 is a diagrammatical illustration of a battery showing a positive transverse angle electrical jumper plug at a positive battery terminal and a negative transverse angle electrical jumper plug at a negative battery terminal, in accordance with the present invention;

FIG. 23 is a detail view of the positive transverse angle electrical jumper plug of FIG. 22 showing a split prong;

FIG. 24 is a detail view of the negative transverse angle electrical jumper plug of FIG. 22 showing a friction jaw.

DETAILED DESCRIPTION OF THE INVENTION

Figure 1:
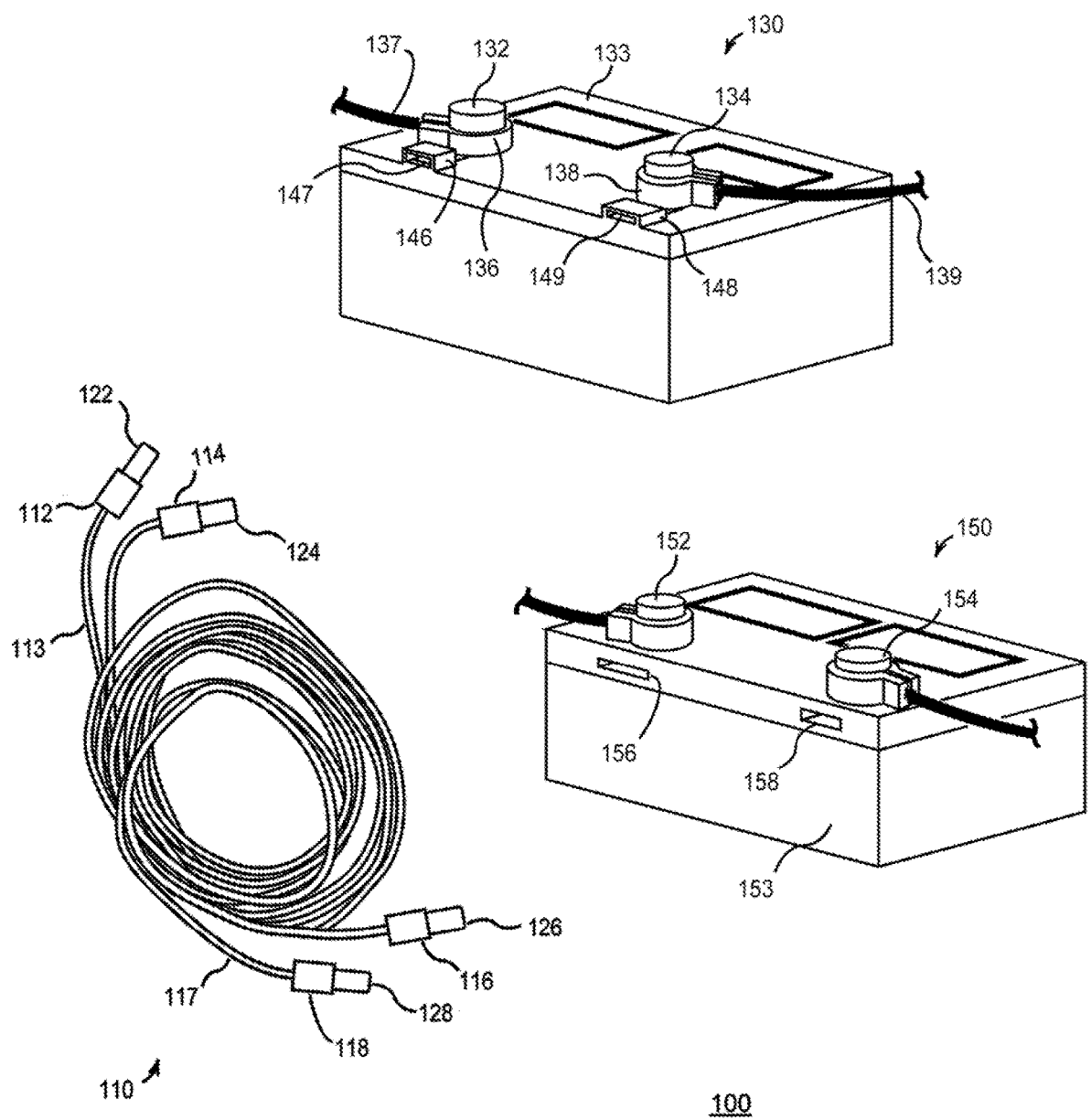
FIG. 1 is a diagrammatical illustration of a jump starting system showing a battery jumper plug cable used to conduct an electrical charging current provided by a charged battery, with external, embossed battery contact sockets, to a drained battery with internal electrical contact slots, in accordance with the present invention.

Various exemplary embodiments of the present invention are described in the specification below, each with reference to the appropriate Figure(s). It should be understood that, for clarity of illustration, not all disclosed electrical jumper plugs, battery contact sockets, and electrical contact slots are shown to the same scale, or in correct proportion to one another, and should not be taken as literal illustrations of actual connector and battery features. In addition, to more explicitly illustrate physical attributes and features, drawings are presented with defined edges and corners, and flat surfaces. It is understood by those skilled in the art that present-day manufacturing methods can produce such components with rounded edges and corners, and curved surfaces.

The present invention is a system of pronged electrical jumper plugs on jumper cables configured for connection to polarized electrical contact slots in battery housings. Positive and negative electrical charging connections to source/load battery terminals are made without the need for conventional spring-loaded serrated jaw battery clamps. Indubitably, such systems of pronged electrical jumper plugs and polarized electrical contact slots: (i) enable electrically connecting to a battery without causing surface damage to battery terminals or to engine battery clamps, (ii) assure proper polarity between a source battery and a load battery, (iii) reduce the possibility of hydrogen gas ignition from electrical sparks at a battery terminal, and (iv) provide for unique top, side, and front electrical charging connection locations on the battery to accommodate different engine compartment layouts and awkward access spaces. Additionally, the relative smaller sizes of these innovative pronged electrical jumper plugs, compared to conventional battery clamps, makes handling a less awkward task, and reduces the possibility of inadvertently contacting a metallic engine component when initiating electrical connection to battery terminals. Moreover, the various battery jumper plug cables disclosed herein are, for the most part, interchangeable for use with the various battery configurations illustrated in the drawings and described below.

FIG. 1 illustrates an exemplary embodiment of a jump starting system 100, in accordance with an aspect of the present invention. A battery jumper plug cable 110 is used to conduct an electrical charging current provided by a live (i.e., charged) top-terminal source battery 130 to a depleted (i.e., drained) load battery 150. In this example, the source battery 130 is configured and manufactured in accordance with disclosed features of U.S. Utility patent application Ser. No. 17/958,326 "Automotive battery with embossed electrical contact sockets," incorporated by reference herein in its entirety. The load battery 150 is configured and manufactured in accordance with disclosed features of commonly-assigned U.S. Utility patent application Ser. No. 17/734,107 "Automotive battery with integral electrical contact slots," also incorporated by reference herein in its entirety.

The battery jumper plug cable 110 includes a positive insulated electrical conductor 113 and a negative insulated electrical conductor 117. The insulated electrical conductors 113, 117 each have sufficient cross-sectional areas to safely conduct high amperage engine starter current. One positive electrical conductor end of the positive insulated electrical conductor 113 is attached to a positive jumper plug 112 and is electrically connected to a positive electrical prong 122 in the positive jumper plug 112. The other positive electrical conductor end is attached to a positive jumper plug 116 and is electrically connected to a positive electrical prong 126 in the positive jumper plug 116. One negative electrical conductor end of the negative insulated electrical conductor 117 is attached to a negative jumper plug 114 and is electrically connected to a negative electrical prong 124 in the negative jumper plug 114. The other negative electrical conductor end is attached to a negative jumper plug 118 and is electrically connected to a negative electrical prong 128 in the negative jumper plug 118.

To insure proper polarity when a user is electrically connecting the source battery 130 to the load battery 150, for example, the positive electrical prongs, 122, 126 are wider than the negative electrical prongs 124, 128. In addition, the negative electrical prongs 124, 128 are thicker than the positive electrical prongs 122, 126. The battery jumper plug cable 110 thus includes a first polarized jumper plug pair, i.e., the positive jumper plug 112 with the negative jumper plug 114, and includes a second polarized jumper plug pair, i.e., the positive jumper plug 116 with the negative jumper plug 118. It can be appreciated by one skilled in the relevant art that, in an alternative embodiment, these prong sizes and aspect ratios can be reversed between positive and negative electrical jumper plugs.

The source battery 130 includes a positive battery contact socket 146 embossed, or otherwise attached or formed, onto a battery cover 133 adjacent to a positive battery terminal 132. A negative battery contact socket 148 is embossed onto the battery cover 133 adjacent to a negative battery terminal 134. Alternatively, the embossed battery contact sockets 146, 148 may be manufactured as separate components, formed using insulating (i.e., electrically non-conducting) material, such as a plastic, and then bonded to the battery cover 133. The positive battery contact socket 146 includes a positive electrical contact slot 147 extending through the positive battery contact socket 146 to a positive automotive battery clamp 136 attached to an automotive battery positive cable 137, and a negative electrical contact slot 149 extending through the negative battery contact socket 148 to a negative automotive battery clamp 138 attached to an automotive battery negative cable 139. The load battery 150 includes an internal positive electrical contact slot 156 in a battery housing front surface 153 extending to a positive battery post (hidden) inside the load battery 150, and an internal negative electrical contact slot 158 in the battery housing front surface 153 extending to a negative battery post (hidden) inside the load battery 150.

In the charging configuration shown, a user can electrically connect the battery jumper plug cable 110 to the source battery 130 by inserting the positive electrical prong 122 into the positive electrical contact slot 147 to make electrical contact with the positive automotive battery clamp 136, and by inserting the negative electrical prong 124 into the negative electrical contact slot 149 to make electrical contact with the negative automotive battery clamp 138. Using the battery jumper plug cable 110, the user can complete the electrical jumping connection of the source battery 130 to the load battery 150 by inserting the positive electrical prong 126 into the positive electrical contact slot 156 to make electrical contact with the positive battery post (hidden), which is part of a positive battery terminal 152, and by inserting the negative electrical prong 128 into the negative electrical contact slot 158 to make electrical contact with the negative battery post (hidden), which is part of a negative battery terminal 154. Thus, a positive electrical charging path is made between the positive battery terminal 132 and the positive battery terminal 152, and a negative electrical charging path is made between the negative battery terminal 134 and the negative battery terminal 154 without the use of conventional spring-loaded serrated jaw battery clamps.

Figure 2:
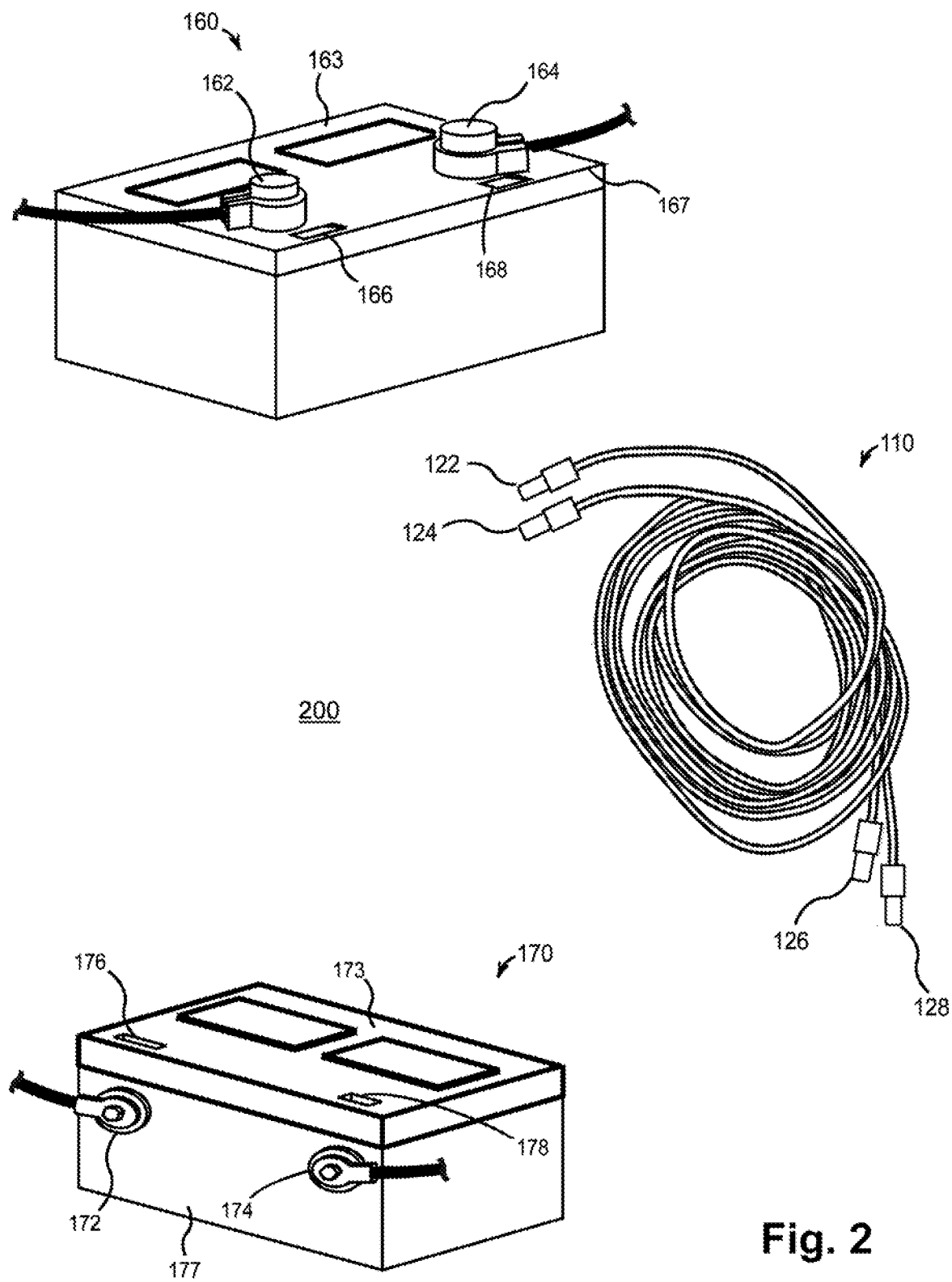
FIG. 2 is a diagrammatical illustration of a jump starting system showing the battery jumper plug cable of FIG. 1 used to conduct an electrical charging current provided by a charged battery with internal electrical contact slots to a drained battery, also with internal electrical contact slots, in accordance with the present invention.

FIG. 2 illustrates another exemplary embodiment of a jump starting system 200. The battery jumper plug cable 110 is used to conduct an electrical charging current provided by a live source battery 160 to a depleted side-terminal load battery 170. In this example, both batteries 160, 170 are configured and manufactured in accordance with features disclosed in U.S. Utility patent application Ser. No. 17/734,107. The source battery 160 includes a positive battery electrical contact slot 166 in a battery cover 163, located between a positive battery terminal 162 and a front battery edge 167. The positive battery electrical contact slot 166 extends to a positive battery post (hidden), which is an internal part of the positive battery terminal 162. A negative battery electrical contact slot 168 is provided in the battery cover 163, located between a negative battery terminal 164 and the front battery edge 167. The negative battery electrical contact slot 168 extends to a negative battery post (hidden), which is an internal part of the negative battery terminal 164. The load battery 170 includes: (i) a positive battery electrical contact slot 176 in a battery cover 173, extending to a positive load internal battery post (hidden) positioned behind a positive battery side terminal 172 on a battery front surface 177, and (ii) a negative battery electrical contact slot 178 in the battery cover 173, extending to a negative load internal battery post (hidden) positioned behind a negative battery side terminal 174 on the battery front surface 177.

In the charging configuration shown, a user can electrically connect the battery jumper plug cable 110 to the source battery 160 (i) by inserting the positive electrical prong 122 into the positive battery electrical contact slot 166 to make electrical contact with the internal positive battery post, and accordingly, with the positive battery terminal 162, and (ii) by inserting the negative electrical prong 124 into the negative battery electrical contact slot 168 to make electrical contact with the internal negative battery post, and accordingly, with the negative battery terminal 164. Using the battery jumper plug cable 110, the user can complete the electrical connection of the source battery 160 to the load battery 170 (i) by inserting the positive electrical prong 126 into the positive battery electrical contact slot 176 to make electrical contact with the internal positive battery post, and accordingly, with the positive battery side terminal 172, and (ii) by inserting the negative electrical prong 128 into the negative battery electrical contact slot 178 to make electrical contact with the internal negative battery post, and accordingly, with the negative battery side terminal 174.

Figure 3:
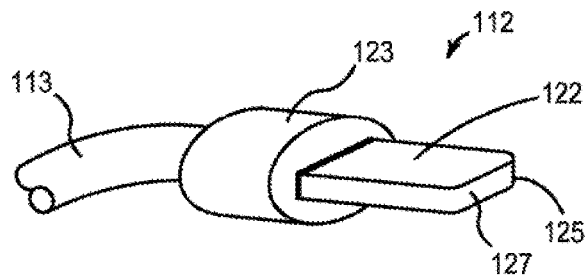
FIG. 3 shows an electrical jumper plug with a fixed electrical prong connected to an electrical conductor inside a jumper plug grip, in accordance with the present invention.

FIG. 3 is a detail view of the positive source electrical jumper plug 112 showing the positive electrical prong 122 fixed to an electrically nonconductive jumper plug grip 123, which may be fabricated from a plastic material. The positive source jumper plug 112 is electrically connected to the positive insulated electrical conductor 113 inside the electrically nonconductive jumper plug grip 123. In the exemplary embodiment shown, the positive electrical prong 122 is a substantially planar component, having a substantially rectangular cross section, and is made from an electrically conductive material, such as a copper alloy. There may be a rounded prong corner 125 on at least one positive prong leading edge 127 to aid in the insertion of the positive electrical prong 122 into a positive electrical contact slot (not shown). The positive electrical prong 126, shown in FIG. 2, is substantially physically similarly to the positive electrical prong 122.

Figure 4:
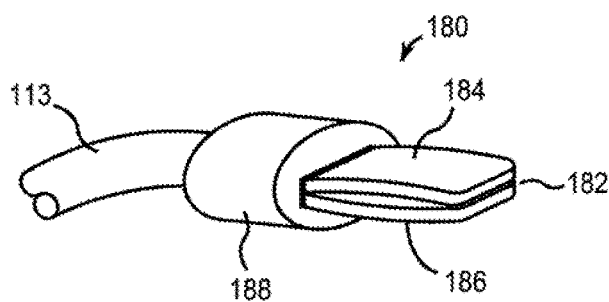
FIG. 4 shows an electrical jumper plug with a compressible electrical prong connected to an insulated electrical conductor inside a jumper plug grip, in accordance with the present invention.

FIG. 4 shows an electrical jumper plug 180 that includes a substantially rectangular compressible electrical prong 182 formed from a curved prong blade 184 and an opposed curved prong blade 186. Alternatively, only one of the prong blades 184, 186 is curved, and the other of the prong blades 186, 184 can be planar (not shown). Each prong blade 184, 186 is fabricated from an electrically conductive material, such as a copper alloy. The combination of opposed prong blades 184, 186 provides a spring-like action that increases contact friction and prong retention inside an electrical contact slot. The compressible electrical prong 182 is electrically connected to the positive insulated electrical conductor 113 inside an electrically non-conductive jumper plug grip 188. The jumper plug 180 compressible electrical prong configuration can be used in place of the solid electrical prong jumper plug 112, 114, 116, 118 configurations shown in FIG. 1, for example.

Figure 5:
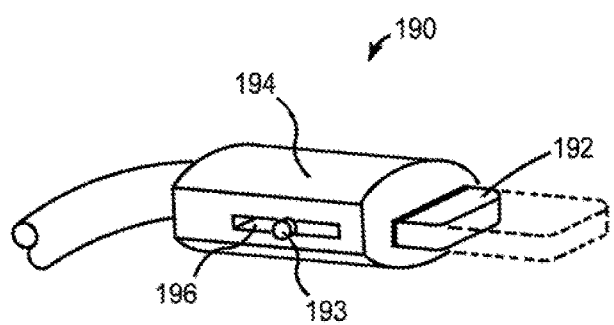
FIG. 5 shows an electrical jumper plug with a retractable prong connected to an insulated electrical conductor inside a jumper plug grip, in accordance with the present invention.

FIG. 5 shows a retractable electrical jumper plug 190 that includes an electrical prong 192 which can be longitudinally retracted into a jumper plug grip 194 when not in use. A user can slide a prong retraction button 193 to retract the electrical prong 192 when needed to prevent accidental electrical shorting. A planar electrical conductor 196, fixed inside the jumper plug grip 194, is in electrical contact with the positive insulated electrical conductor 113, and is in continuous electrical contact with the electrical prong 192, whether retracted or extended. The retractable electrical jumper plug 190 can be used in place of the jumper plug 180 shown in FIG. 4, or the positive jumper plug 112 shown in FIG. 3.

Figure 6:
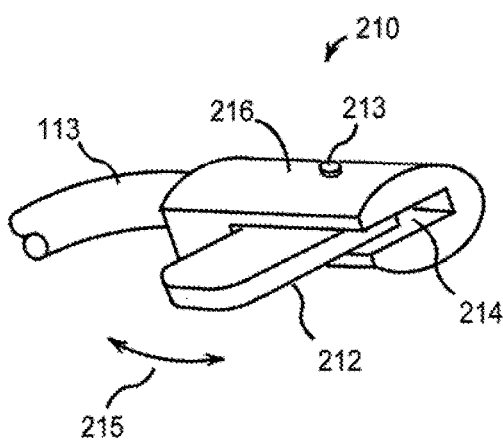
FIG. 6 shows an electrical jumper plug with a lateral swivel prong connected to an insulated electrical conductor inside a jumper plug grip, in accordance with the present invention.

FIG. 6 shows a convertible electrical jumper plug 210 that can be electrically attached to the positive insulated electrical conductor 113 for use in a jumper plug cable (not shown). The convertible electrical jumper plug 210 includes a swivel electrical prong 212 that is rotatably secured to a swivel pin 213 which is fixed to a convertible jumper plug grip 216. This feature allows the swivel electrical prong 212 to be laterally rotated within a corner slot 214 in the convertible jumper plug grip 216, as indicated by an arrow 215. The swivel electrical prong 212 maintains continuous electrical contact with an internal conductive trace (hidden) attached to the positive insulated electrical conductor 113, as the swivel electrical prong 212 converts from a straight configuration (not shown) to a substantially right-angle configuration, as shown. The convertible electrical jumper plug 210 can be used in place of the retractable electrical jumper plug 190 shown in FIG. 5, or in place of the jumper plug 180 shown in FIG. 4, or in place of the positive jumper plug 112 shown in FIG. 3.

FIG. 7 shows an exemplary embodiment of a jump starting system 220, in accordance with an aspect of the present invention. A battery jumper plug cable 230 is used to conduct an electrical charging current from a live source battery 240 to a depleted load battery 250. The battery jumper plug cable 230 includes the electrical prongs 122, 124 at one end, and includes the convertible electrical jumper plug 210 and a convertible electrical jumper plug 232 with a negative electrical prong 234 at another end, as shown. The source battery 240 includes a positive electrical contact open slot 247 in a positive battery channel socket 246 on a surface of a battery cover 241, and is located adjacent to a positive battery terminal 242. A negative electrical contact open slot 249 in a negative battery channel socket 248 is provided on the surface of the battery cover 241, and is located adjacent to a negative battery terminal 244. The load battery 250 includes a positive electrical contact slot 257 in a positive battery socket 256 to provide electrical connection directly to a positive battery terminal 252, and includes a negative electrical contact slot 259 in a negative battery socket 258 to provide electrical connection directly to a negative battery terminal 254. The load battery 250 is configured and manufactured in accordance with features disclosed in U.S. Utility patent application Ser. No. 17/958,326.

In the charging configuration shown, a user can electrically connect the battery jumper plug cable 230 to the source battery 240 by inserting the positive electrical prong 122 into the positive electrical contact open slot 247, and by inserting the negative electrical prong 124 into the negative electrical contact open slot 249. Using the battery jumper plug cable 230, the user can the complete the electrical connection of the source battery 240 to the load battery 250 by inserting the positive swivel electrical prong 212 into the positive electrical contact slot 257, and by inserting the negative electrical prong 234 into the negative electrical contact slot 259.

FIG. 8 is a detail view of the negative battery channel socket 248, which may be fabricated as part of, and from the same electrically insulating material as, the battery cover 243, or may be bonded or embossed to the battery cover 243 using chemical or thermal bonding. In the example shown, the negative battery channel socket 248 is configured as a mesa-like component having sloping sides 262, 264 and a linear channel forming the negative electrical contact open slot 249 between the sloping sides 262, 264. The width of the negative electrical contact open slot 249 is smaller than the thickness of the negative electrical prong 124, shown in FIG. 7, so as to provide for frictional retention of the negative electrical prong 124 when inserted into the negative electrical contact open slot 249, thus making electrical contact with a negative battery clamp 263. If the negative battery clamp 263 is not present, the negative electrical prong 124 can be further inserted along the negative electrical contact open slot 249 to make electrical contact with the negative battery terminal 244. In addition, the width of the negative electrical contact open slot 249 is greater than the thickness of the positive electrical prong 122 so as to preclude inadvertent retention of the positive electrical prong 122 in the negative electrical contact open slot 249.

FIG. 9 is a detail view of the positive battery channel socket 246. The positive battery channel socket 246 is configured as an embossed mesa-like component having sloping sides 266, 268 and a nonlinear channel forming the positive electrical contact open slot 247 between the sloping sides 266, 268. The width of the positive electrical contact open slot 247 is smaller than the thickness of the negative electrical prong 124, shown in FIG. 7, so as to preclude insertion of the negative electrical prong 124 into the positive electrical contact open slot 247, and to prevent electrical contact with a positive battery clamp 267. The positive electrical contact open slot 247 is also nonlinear (e.g., a curved, bowed, or serpentine channel), so as to frictionally retain the positive electrical prong 122 when inserted into the positive electrical contact open slot 247 to make electrical contact with the positive battery clamp 267 or with the positive battery terminal 242. It should be understood that the particular geometric mesa shapes of the battery channel sockets 246, 248 are not critical so long as there is sufficient mechanical structure and strength at the bases of the battery channel sockets 246, 248 to frictionally retain the respective electrical prongs 122, 124 in contact with the respective battery clamps 267, 263 or with the respective battery terminals 242, 244.

It can be appreciated by one skilled in the art that the sizes and shapes of the channels forming the positive electrical contact open slot 247 and the negative electrical contact open slot 249 can be interchanged, as may be preferred by a battery manufacturer. That is, the positive contact open slot 247 may include a linear channel (not shown) and the negative electrical contact open slot 249 may include a nonlinear channel (not shown). It can be further appreciated by one skilled in the art that the battery channel sockets 246, 248 can be modified and adapted for use on a battery having side terminals (not shown).

Figure 10:
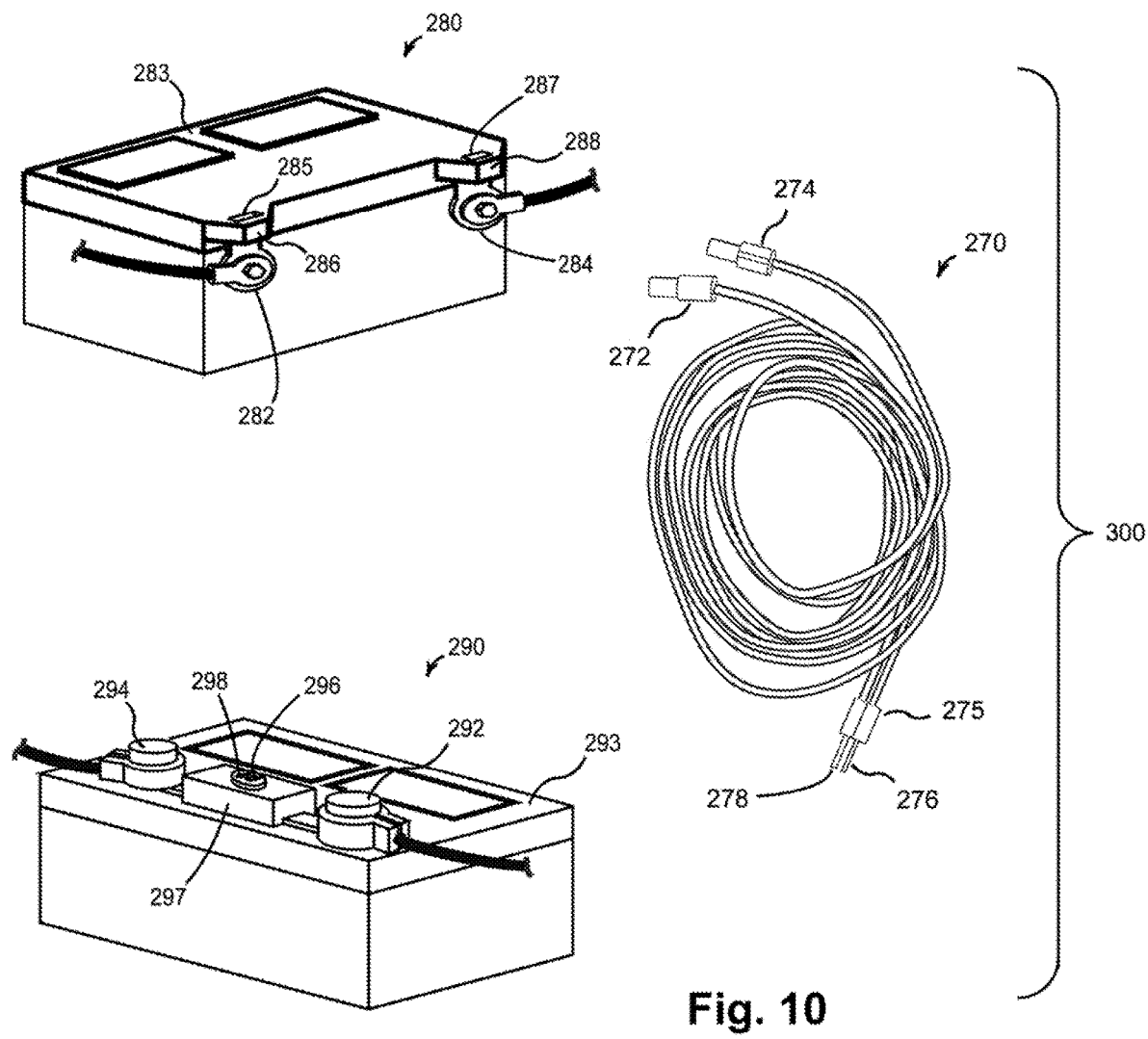
FIG. 10 is a diagrammatical illustration of a jump starting system showing a battery jumper plug cable with a dual prong electrical jumper plug used to conduct an electrical charging current provided by a charged battery, with side terminal battery sockets, to a drained battery with a battery transverse clamp, in accordance with the present invention.

FIG. 10 illustrates yet another configuration of a jump starting system 300, in accordance with an aspect of the present invention. A battery jumper plug cable 270 is used to conduct an electrical charging current provided by a live source battery 280 to a depleted load battery 290. The source battery 280 includes a positive battery socket 286 extending from a battery housing 283, and adjacent to a positive battery side terminal 282. A negative battery socket 288 also extends from the battery housing 283, and is disposed adjacent to a negative battery side terminal 284. The load battery 290 includes a positive battery terminal 292 and a negative battery terminal 294. A battery transverse clamp 297 has been installed on a battery cover 293 and placed into electrical contact with the battery terminals 292, 294 in accordance with the disclosed features of U.S. Pat. No. 10,862,231 entitled "Automotive battery booster cable battery clamp," incorporated by reference herein in its entirety. Installation of the battery transverse clamp 297 enables electrical attachment to the load battery 290 via the battery jumper plug cable 270.

The battery jumper plug cable 270 includes a positive electrical jumper plug 272 that is configured for insertion into a positive electrical contact slot 285 in the source battery 280, and includes a negative electrical jumper plug 274 that is configured for insertion into a negative electrical contact slot 287. The battery jumper plug cable 270 also includes a dual prong electrical jumper plug 275 with a positive electrical prong 276 and a negative electrical prong 278 for insertion into a positive electrical contact slot 296 and a negative electrical contact slot 298 in the battery transverse clamp 297, respectively.

Figure 11:
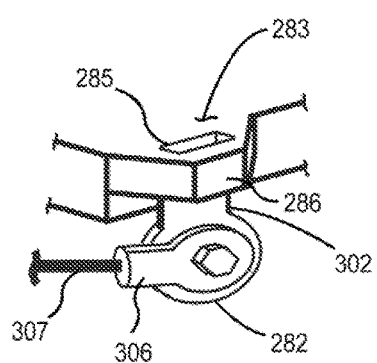
FIG. 11 is a detail view of the positive side terminal battery socket on the charged battery of FIG. 10.
Figure 12:
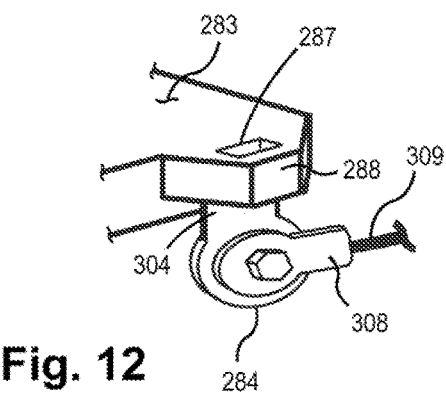
FIG. 12 is a detail view of the negative side terminal battery socket on the charged battery of FIG. 10.

FIG. 11 is a detail view of the positive battery socket 286, configured as a projecting mesa enclosing the positive electrical contact slot 285, preferably embossed or formed as an integral part of the battery cover 283. The positive electrical contact slot 285 functions to guide an inserted positive jumper plug (not shown) into electrical contact with a positive terminal contact pad 302, which is part of the positive battery side terminal 282. That is, the positive terminal contact pad 302 is an electrically conductive trace, preferably of a lead alloy, that can be fabricated on the exterior of the source battery 280 during manufacture. The illustration also shows a positive automotive battery cable 307 with an attached positive battery terminal clamp 306 mechanically secured to the positive battery side terminal 282, a configuration typically found in the engine compartment of an automobile. FIG. 12 shows the negative battery socket 288, configured as a projecting mesa enclosing the negative electrical contact slot 287, also embossed or formed as an integral part of the battery cover 283. The negative electrical contact slot 287 functions to guide an inserted negative jumper plug (not shown) into electrical contact with a negative terminal contact pad 304, which is part of the negative battery side terminal 284. A negative battery terminal clamp 308 with a negative automotive battery cable 309 is typically electrically connected to the negative battery side terminal 284, as shown.

Figure 13:
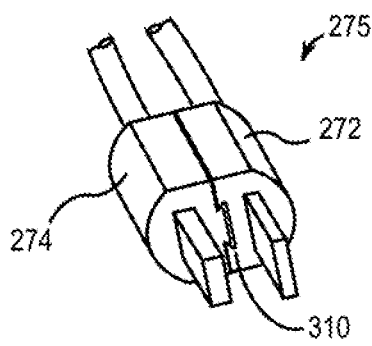
FIG. 13 is a detail view showing the dual prong electrical jumper plug of FIG. 10 with a positive jumper plug slidably attached to a negative jumper plug via a dovetail joint.
Figure 14:
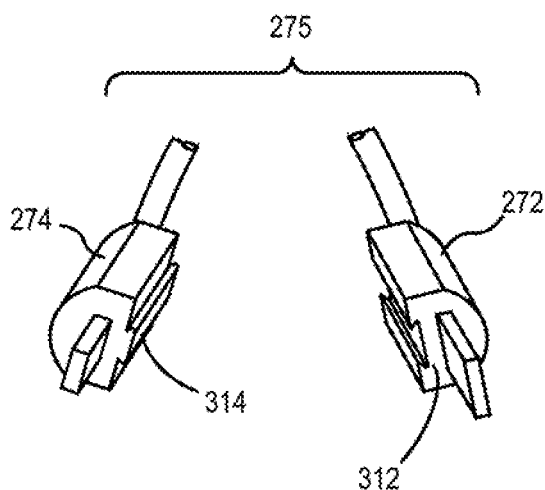
FIG. 14 is a detail view of a positive jumper plug and a negative jumper plug forming the dual prong electrical jumper plug of FIG. 13.

FIG. 13 is a detail view showing that the dual prong electrical jumper plug 275 includes the positive electrical jumper plug 272 removably attached to the negative electrical jumper plug 274 via a dovetail joint 310. As seen in FIG. 14, the positive electrical jumper plug 272 includes a joint groove 312 configured for insertion of a joint tail 314 on the negative electrical jumper plug 274. This attachment feature allows the electrical jumper plugs 272, 274 to be used separately, as with the source battery 280 in FIG. 10, or configured as the dual prong electrical jumper plug 275 for mating with the battery transverse clamp 297 on the load battery 290.

Figure 15:
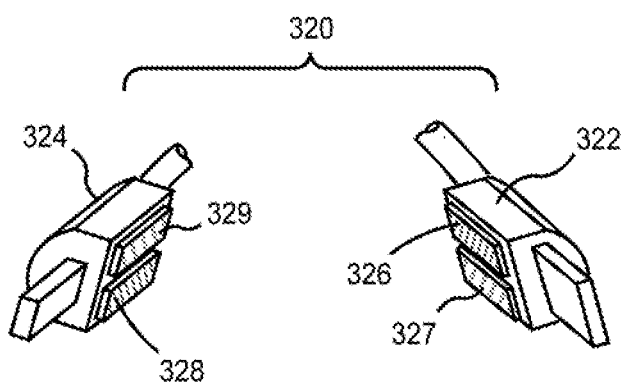
FIG. 15 is a detail view of a positive jumper plug and a negative jumper plug forming a dual prong electrical jumper plug, positive and negative jumper plugs joined using a magnetic attachment, in accordance with the present invention.

In an alternative embodiment, FIG. 15 shows a dual prong electrical jumper plug 320 that includes a positive electrical jumper plug 322 which is magnetically attachable to a negative electrical jumper plug 324. The positive electrical jumper plug 322 includes a magnetic strip 326 adjacent to a metal strip 327, and the negative electrical jumper plug 324 includes a metal strip 329 adjacent to a magnetic strip 328. The dual prong electrical jumper plug 320 is assembled by placing the magnetic strip 326 against the metal strip 329, and placing the magnetic strip 328 against the metal strip 327. The dual prong electrical jumper plug 320 can be used in place of the dual prong jumper plug 275 at either end of the battery jumper plug cable 270, shown in FIG. 10.

Figure 16:
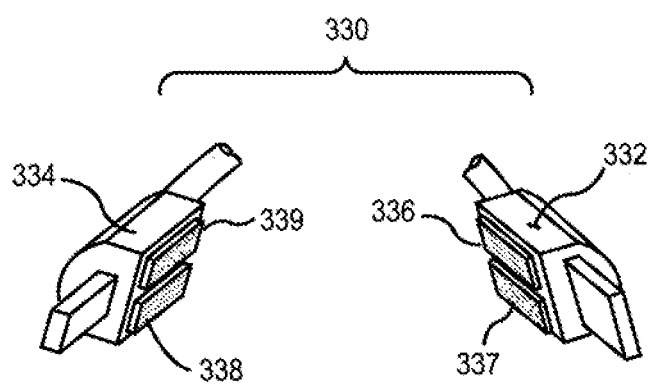
FIG. 16 is a detail view of a positive jumper plug and a negative jumper plug forming a dual prong electrical jumper plug, positive and negative jumper plugs joined using a hook and pile attachment, in accordance with the present invention.

In another embodiment, FIG. 16 shows a dual prong electrical jumper plug 330 that includes a positive jumper plug 332 which is removably attachable to a negative jumper plug 334 using a hook-and-pile combination commercially available, for example, as VELCRO. The positive jumper plug 332 includes a hook strip 336 adjacent to a pile strip 327, and the negative jumper plug 324 includes a pile strip 339 adjacent to a hook strip 338. The dual prong electrical jumper plug 330 is assembled by placing the hook strip 336 against the pile strip 339, and placing the hook strip 338 against the pile strip 337. The dual prong electrical jumper plug 330 can be used in place of the dual prong electrical jumper plug 275 at either end of the battery jumper plug cable 270, shown in FIG. 10.

Figure 17:
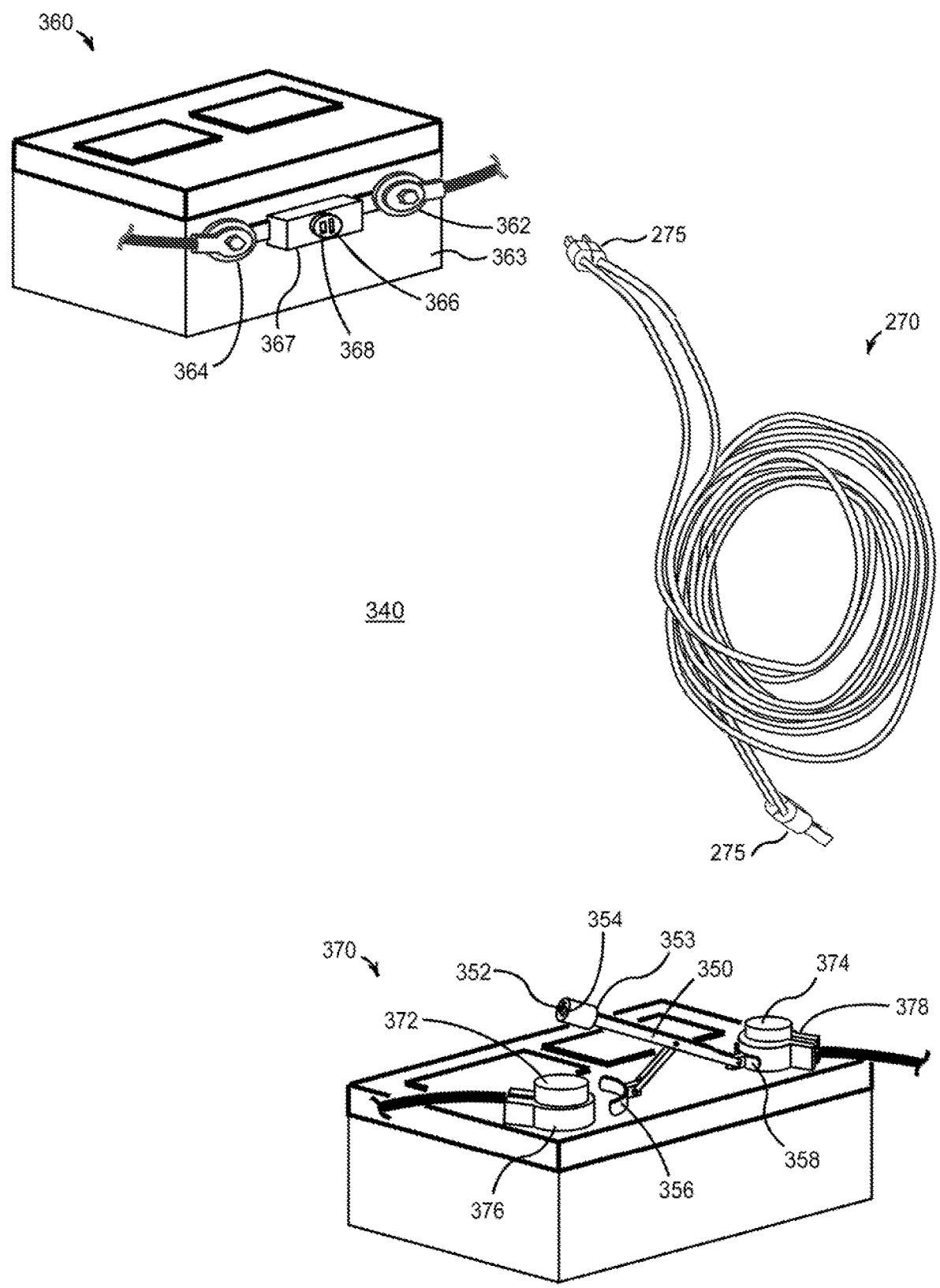
FIG. 17 is a diagrammatical illustration of a jump starting system showing the battery jumper plug cable of FIG. 10 used to conduct an electrical charging current from a charged battery with a novel battery transverse clamp, to a drained battery with a novel battery clamp, in accordance with the present invention.

FIG. 17 illustrates another configuration of a jump starting system 340, in accordance with an aspect of the present invention. A live source battery 360 is to be electrically connected to a depleted conventional load battery 370 using the battery jumper plug cable 270 with the two terminal dual prong jumper plugs 275. The source battery 360 includes a positive battery side terminal 362 and a negative battery side terminal 364. As the source battery 360 is a conventional battery, not configured for direct electrical connection to the dual prong jumper plug 275, a battery transverse clamp 367 has been installed, and is connected to both the positive battery side terminal 362 and the negative battery side terminal 364 on a battery surface 363, in accordance with U.S. Pat. No. 10,862,231 "Automotive battery booster cable battery clamp." A positive electrical contact opening 366 in the battery transverse clamp 367 provides access to an electrical path to the positive battery side terminal 362, and a negative electrical contact opening 368 provides access to an electrical path to the negative battery side terminal 364.

The conventional load battery 370 includes a positive battery terminal 372 and a negative battery terminal 374. As the load battery 370 is a conventional battery, and thus not configured for direct electrical connection to the dual prong electrical jumper plug 275, a battery clamp 350 is removably emplaced on the conventional load battery 370, in accordance with features disclosed in U.S. Pat. No. 9,178,292 "Compact battery clamp and booster cable," or alternatively, in U.S. Pat. No. 9,815,378 "Polarized battery clamp and booster cable," both incorporated herein by reference in their entireties. The battery clamp 350 includes a positive terminal contact pad 356 configured to make electrical contact with either a positive automotive battery clamp 376 when clamped onto the positive battery terminal 372, or with the positive battery terminal 372 itself when the positive automotive battery clamp 376 is not attached. The battery clamp 350 also includes a negative terminal contact pad 358 configured to make electrical contact with either a negative automotive battery clamp 378 or with the negative battery terminal 374. A positive electrical contact opening 352 in a battery clamp electrical receptacle 353 on the battery clamp 350 provides access to an electrical path to the positive terminal contact pad 356, and a negative electrical contact opening 354 provides access to an electrical path to the negative terminal contact pad 358. The live source battery 360 can thus be electrically connected to the depleted conventional load battery 370 by inserting either dual prong electrical jumper plug 275 on the battery jumper plug cable 270 into the battery transverse clamp 367, and by inserting the other dual prong electrical jumper plug 275 into the battery clamp electrical receptacle 353 on the battery clamp 350.

There is shown in FIG. 18 another configuration of a jump starting system 400, in accordance with an aspect of the present invention. A battery jumper plug cable 260 is used to electrically connect a live source battery 380 to a depleted load battery 390. The battery jumper plug cable 260 includes two polarized sets of the positive electrical jumper plug 210 and the negative electrical jumper plug 232. The source battery 380 includes a positive battery terminal 382 and a negative battery terminal 384. A positive electrical contact socket 386 is electrically connected to the positive battery terminal 382 by an electrically conductive trace 387, and a negative electrical contact socket 388 is electrically connected to the negative battery terminal 384 by an electrically conductive trace 389, in accordance with U.S. Utility patent application Ser. No. 17/958,326. The live source battery 380 can thus be electrically connected to the battery jumper plug cable 260 by inserting a first positive swivel electrical prong 212 on the battery jumper plug cable 260 into the positive electrical contact socket 386, and inserting a first negative electrical prong 234 into the negative electrical contact socket 388.

The load battery 390 includes a positive battery side terminal 392 and a negative battery side terminal 394. A positive electrical contact socket 396 is electrically connected to the positive battery side terminal 392, and a negative electrical contact socket 398 is electrically connected to the negative battery side terminal 394, in accordance with U.S. Utility patent application Ser. No. 17/958, 326. The load battery 390 can be electrically connected to the battery jumper plug cable 260 by inserting the other positive swivel electrical prong 212 into a positive electrical contact socket 397, and inserting the other negative electrical prong 234 into a negative electrical contact socket 399.

It can be appreciated that conventional automotive batteries remain in production, and it will require some time for such batteries to be phased out by automotive manufacturers in favor of batteries that incorporate electrical contact slots and electrical contact sockets, in accordance with the present invention. In the meantime, however, the battery jumper plug cables disclosed herein can be used on conventional automotive batteries when slightly modified. For example, removably emplaceable battery lug sockets, described below, can enable use of the battery jumper plug cables 110, 230, 260, and 270, above, in jump starting applications where one or both batteries are conventional batteries.

Figure 19:
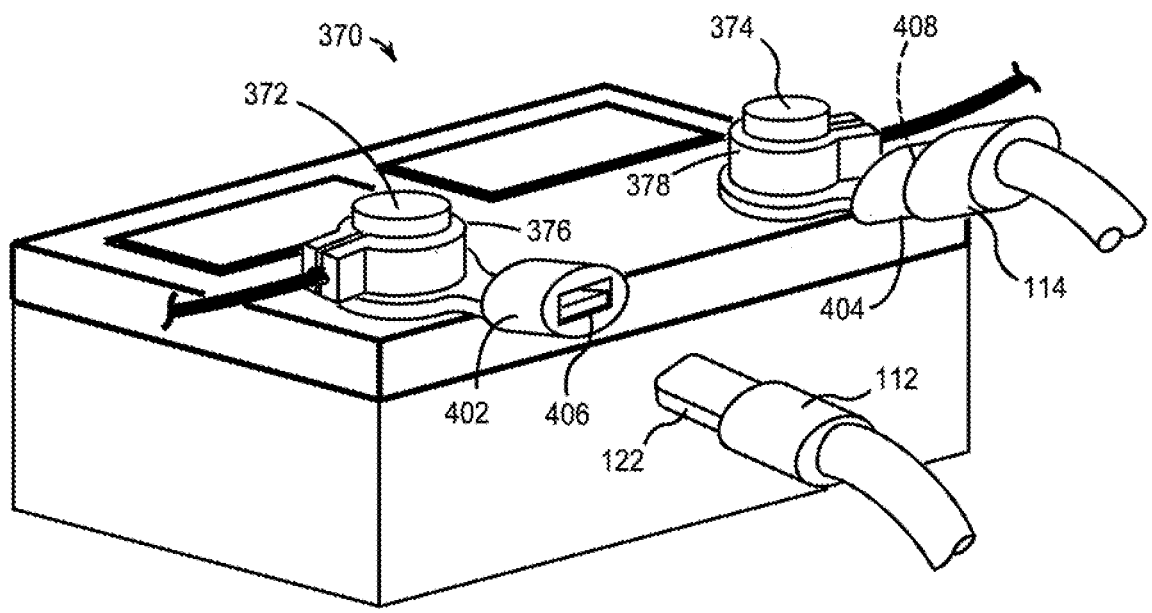
FIG. 19 is a diagrammatical illustration of a battery with battery ring lug sockets mounted on battery terminals, in accordance with the present invention.

FIG. 19 shows the conventional load battery 370 with the positive automotive battery clamp 376 on the positive battery terminal 372 and the negative automotive battery clamp 378 on the negative battery terminal 374. A positive battery ring lug socket 402 has been placed in contact with the positive battery terminal 372 and is secured under the positive automotive battery clamp 376. Likewise, a negative battery ring lug socket 404 has been placed in contact with the negative battery terminal 374 and is secured under the negative automotive battery clamp 378. The positive jumper plug 112 (seen in FIG. 1) is positioned for insertion of the positive electrical prong 122 into a positive battery lug electrical contact slot 406. The negative jumper plug 114 has been inserted into a corresponding negative battery lug electrical contact slot 408 (hidden) in the negative battery ring lug socket 404. The battery ring lug sockets 402, 404 are thus not permanently attached to respective battery terminals 372, 374, but rather are portable and can be moved to battery terminals on another battery as needed. Accordingly, placement of the battery ring lug sockets 402, 404 onto the conventional load battery 370 enables a user to conduct a jump starting operation with any one of the battery jumper plug cables 110, 230, 260, or 270, for example, whether the conventional battery 370 is the charged battery or is the depleted battery. Using the battery jumper plug cable 110 enables a user to electrically connect the conventional battery 370 to the top terminal source battery 130 (shown in FIG. 1).

Figure 20:
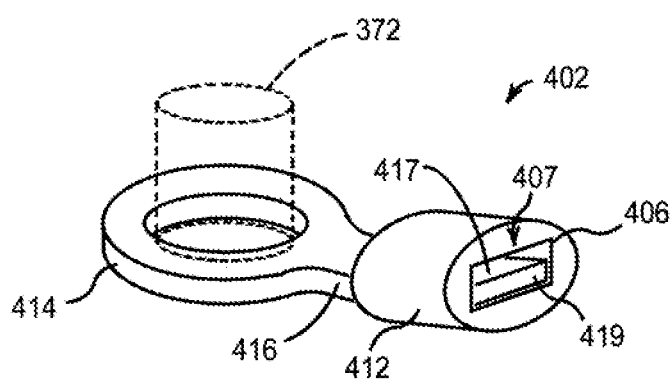
FIG. 20 is a detail view of the positive battery ring lug socket of FIG. 19.

FIG. 20 is a detail view of the positive battery ring lug socket 402 positioned on the positive battery terminal 372 (in phantom). The positive battery ring lug socket 402 includes a substantially cylindrical positive battery socket shell 412 made of electrically nonconductive material, preferably a rigid material, and having a positive socket shell opening 406, substantially rectangular in cross sectional shape, extending into the positive battery socket shell 412. This cross-sectional shape of the positive socket shell opening 406 is configured to conform to the cross-sectional shape of an electrical prong intended for insertion into the positive battery ring lug socket 402.

The positive socket shell opening 406 may be a blind hole as shown, or may extend completely through the positive battery socket shell 412 as a through hole (not shown). An electrically conductive ring lug 414 is configured to make electrical contact with the positive battery terminal 372, as shown, and is part of a positive electrically conductive lead 416, preferably made of a copper alloy, secured in the positive battery socket shell 412. The electrically conductive lead 416 extends into the positive battery socket shell 412 where an electrically conductive lead contact surface 417 has a positive lead end 419 exposed at the positive socket shell opening 406. The electrically conductive lead contact surface 417, with the positive socket shell opening 426, form a positive battery lug electrical contact slot 407. The electrically conductive lead 416 has a thickness smaller than the opening height of the positive socket shell opening 406 so as to allow for insertion of the positive electrical prong 122 (shown in FIG. 19), or of a similar positive electrical prong, into the positive battery lug electrical contact slot 407. It should be understood that the negative battery ring lug socket 404 is similar to the positive battery ring lug socket 402, but may have a dimensionally different electrically conductive ring lug (not shown) to accommodate a negative battery terminal.

Figure 21:
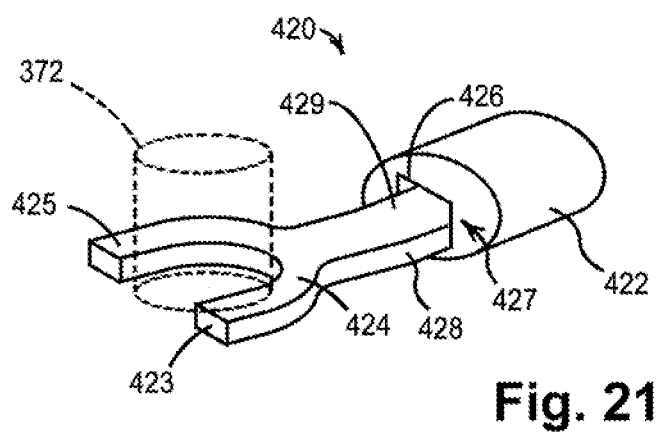
FIG. 21 is a detail view of a positive battery fork lug socket placed on the positive battery terminal of FIG. 19, in accordance with the present invention.

Another configuration of a portable battery lug socket is a positive battery fork lug socket 420, here shown emplaced on the positive battery terminal 372 (in phantom) in FIG. 21. The positive battery fork lug socket 420 includes a substantially cylindrical positive battery socket shell 422 with a positive socket shell opening 426, substantially rectangular in cross sectional shape, and extending through the positive battery socket shell 422. Alternatively, the positive socket shell opening 426 can be configured as a blind hole rather than the through hole as shown. A positive electrically conductive lead 428 is connected to a U-shaped fork lug 424 that includes terminal contact legs 423, 425, here shown emplaced in contact with the positive battery terminal 372.

Note that a V-shaped fork lug (not shown) or a C-shaped fork lug (not shown) can be used in place of the U-shaped fork lug 424. The positive electrically conductive lead 428 and the fork lug 424 are preferably made of a copper alloy, and the positive battery socket shell 422 is preferably made of an electrically nonconductive material such as a plastic. The positive electrically conductive lead 428 is secured in a lower part of the positive socket shell opening 426, and has a thickness smaller than the height of the positive socket shell opening 426. This configuration allows for insertion of the positive electrical prong 122, seen in FIG. 19, into a positive battery lug electrical contact slot 427 (hidden). When inserted, the positive electrical conductor prong 122 thus makes electrical contact with an electrically conductive lead contact surface 429 on the positive electrically conductive lead 428. The positive battery fork lug socket 420 can be removably retained in electrical contact with the positive battery terminal 372 by the positive automotive battery clamp 376, shown in FIG. 19.

Additional electrical plug configurations are possible for batteries with electrical contact slots in a battery housing front surface, such as the load battery 150 in FIG. 1. FIG. 22 shows a battery 430 with a positive battery terminal 432 and a negative battery terminal 434 on a battery cover 435. A positive electrical contact slot 436 in a battery housing front surface 437 extends to an internal positive battery post (not shown), which is a lower part of the positive battery terminal 432. A negative electrical contact slot 438 in the battery housing front surface 437 extends to an internal negative battery post (not shown), which is a lower part of the negative battery terminal 434. In a first electrical plug configuration, electrical connection to the positive battery terminal 432 via the positive electrical contact slot 436 is provided by a positive insulated electrical conductor 442 connected to a positive transverse angle electrical plug 446. In a second electrical plug configuration, electrical connection to the negative battery terminal 434 via the negative electrical contact slot 438 is provided by a negative insulated electrical conductor 444 connected to a negative transverse angle electrical plug 448.

As best seen in FIG. 23, the positive transverse angle electrical plug 446 includes the positive insulated electrical conductor 442 connected to a positive electrical compressible prong 452 inside an insulated plug grip 458. The positive electrical compressible prong 452, which is oriented substantially perpendicularly transverse to the insulated plug grip 458, includes a convex upper electrical prong 454 and a concave lower electrical prong 456, both electrical prongs 454, 456 functioning as leaf springs to provide frictional retention of the positive electrical compressible prong 452 inside the positive electrical contact slot 436, shown in FIG. 22. Alternatively, one of the electrical prongs 454, 456 may be planar rather than curved (not shown).

FIG. 24 shows that the negative transverse angle electrical plug 448 includes a negative electrical prong 462 oriented essentially perpendicularly transverse to a nonconducting plug grip 464. The negative insulated electrical conductor 444 is connected to the negative electrical prong 462 inside the plug grip 464. A grip jaw 466 extends from an end of the plug grip 464 and is configured to be slid onto the battery cover 435, shown in FIG. 22, when the negative electrical prong 462 is inserted into the negative electrical contact slot 438. A friction pad 469, having a high coefficient of friction, may be attached to a jaw surface 468 of the grip jaw 466 to more securely retain the negative transverse angle electrical plug 448 in position on the battery cover 435 and to thus maintain electrical contact of the negative electrical prong 462 with the internal negative battery post (not shown).

Figure 25:
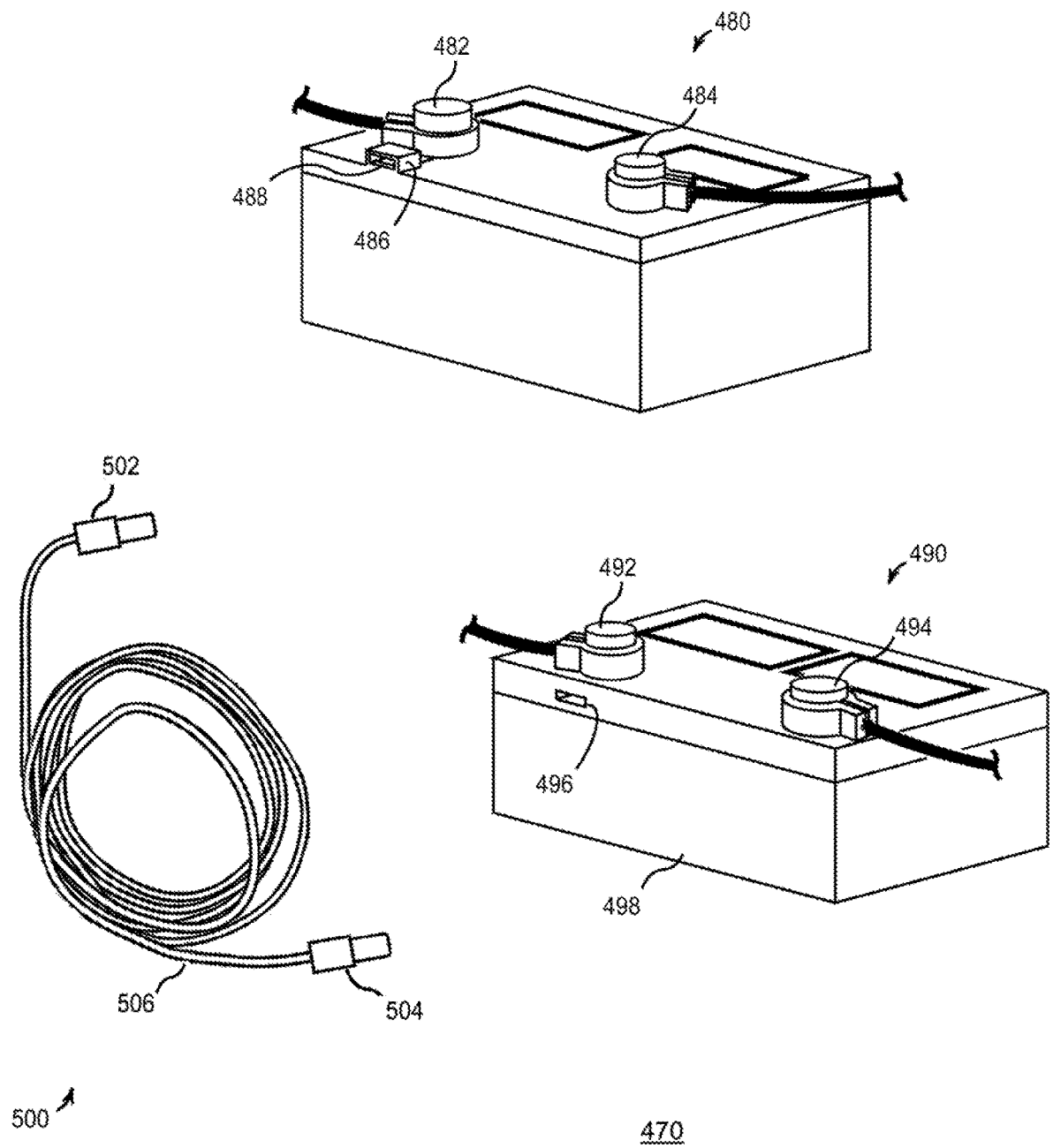
FIG. 25 is a diagrammatical illustration of a jump starting system showing a single battery jumper plug cable used to conduct an electrical charging current provided by a charged battery, with one battery contact socket, to a drained battery with one internal electrical contact slot, in accordance with the present invention.

FIG. 25 illustrates an alternative embodiment of a jump starting system 470, in accordance with an aspect of the present invention. A single battery jumper plug cable 500 is used to conduct an electrical charging current provided by a live top-terminal source battery 480 in a first vehicle to a depleted load battery 490 in a second vehicle. The battery jumper plug cable 500 includes a positive insulated electrical conductor 506 with sufficient cross-sectional areas to safely conduct high amperage engine starter current. One positive electrical conductor end of the positive insulated electrical conductor 506 is attached to a source positive jumper plug 502, and the other positive electrical conductor end is attached to a load positive jumper plug 504.

The source battery 480 includes a positive battery socket 486 embossed, or otherwise attached or formed, onto the source battery 480 adjacent to a positive battery terminal 482. The positive battery socket 486 includes a positive electrical contact slot 488 extending through the positive battery socket 486. The load battery 490 includes a positive electrical contact slot 496 in a battery housing front surface 498 extending to a positive battery post (hidden) inside the load battery 490, below a positive battery terminal 492. The jump starting system 470 is thus adapted to provide a charging configuration with single-slot batteries, as might be provided by an unorthodox battery manufacturer.

In the charging configuration shown, a user can electrically connect the source positive jumper plug 502 to the source battery 480 and connect the load positive jumper plug 504 to the load battery 490 to complete a positive electrical charging path between the positive battery terminal 482 and the positive battery terminal 492. A negative electrical charging path can be made for the source battery 480 and the load battery 490 by using a negative insulated electrical conductor (not shown) connected to two conventional serrated jaw clamps, for example. One serrated jaw clamp is connected to a source vehicle engine or chassis ground (not shown) near the source battery 480, and the other serrated jaw clamp is connected to a load vehicle engine or chassis ground (not shown) near the load battery 490.

It can be appreciated by one skilled in the relevant art that a jumper plug cable need not have four identical electrical jumper plugs, but can include jumper plugs of different configurations as disclosed in the present specification, without limitation, so as to optimize application for a specified battery in a particular automobile engine compartment arrangement. It is to be understood that the description herein is only exemplary of the invention, and is intended to provide an overview for the understanding of the nature and character of the novel features of the disclosed battery electrical contact slot configurations, of the jumper plug configurations, and of the battery jumper plug cable configurations. The accompanying drawings are included to provide a further understanding of various aspects and embodiments of the devices of the invention which, together with their description, serve to explain the relevant principles and operation.

What is claimed is:

1. A jump starting system suitable for use in conducting a charging operation with a source battery used to charge a conventional automotive battery, said jump starting system comprising:
   a battery jumper plug cable (110), said battery jumper plug cable including a positive insulated electrical conductor and a negative insulated electrical conductor, said positive insulated electrical conductor having a first positive electrical jumper plug attached to a first positive electrical conductor end and a second positive electrical jumper plug attached to a second positive electrical conductor end, said negative insulated electrical conductor having a first negative electrical jumper plug attached to a first negative electrical conductor end and a second negative electrical jumper plug attached to a second negative electrical conductor end;

a source battery (130) having a positive battery contact socket (146) embossed on a battery housing adjacent to a positive battery terminal, said positive battery contact socket configured as a mesa enclosing a positive electrical contact slot, said positive electrical contact slot configured to allow insertion of said first positive electrical jumper plug, and a negative battery contact socket (148) embossed on said battery housing adjacent to a negative battery terminal, said negative battery contact socket configured as a mesa enclosing a negative electrical contact slot, said negative electrical contact slot configured to allow insertion of said first negative electrical jumper plug;

a positive battery lug socket (402), said positive battery lug socket including a positive battery socket shell (412) with a positive socket shell opening (406) extending into said positive battery socket shell, said positive battery lug socket also having a positive electrically conductive lead (416) configured to electrically contact a conventional automotive positive battery terminal, said positive electrically conductive lead secured in said positive socket shell such that a positive lead end (419) is exposed at said positive socket shell opening (406) to form a positive battery lug electrical contact slot (407); and, a negative battery lug socket (404), said negative battery lug socket including a negative battery socket shell with a negative socket shell opening extending into said negative battery socket shell, said negative battery lug socket having a negative electrically conductive lead configured to electrically contact a conventional automotive negative battery terminal, said negative electrically conductive lead secured in said negative socket shell such that a negative lead end is exposed in said negative socket shell opening to form a negative battery lug electrical contact slot;

whereby, insertion of said first positive electrical jumper plug into said positive electrical contact slot, insertion of said first negative electrical jumper plug into said negative electrical contact slot, insertion of said second positive electrical jumper plug into said positive battery lug electrical contact slot, and insertion of said second negative electrical jumper plug into said negative battery lug electrical contact slot, placement of said positive battery lug electrical contact slot onto the positive terminal of the conventional automotive battery, and placement of said negative battery lug electrical contact slot onto the negative terminal of the conventional automotive battery, function to electrically connect the source battery with the conventional automotive battery for conducting the charging operation.

2. The jump starting system of claim 1 wherein said first positive electrical plug comprises an electrically nonconductive grip and an electrically conductive prong attached to said positive insulated electrical conductor, said electrically conductive prong (212) oriented at an angle to said electrical nonconductive grip.

3. The jump starting system of claim 1 wherein said positive electrically conductive lead comprises one of a circular ring lug and a U-shaped fork lug.

4. The jump starting system of claim 1 wherein said positive battery socket is embossed on one of a battery cover surface, a battery front surface, and a battery housing surface.

5. The jump starting system of claim 1 wherein said positive battery terminal comprises a battery side terminal with a positive terminal contact pad on a battery front surface.

6. A jump starting system suitable for use in conducting a charging operation with a conventional automotive battery, said jump starting system comprising:

a source battery (240) having a positive battery channel socket (248) embossed on a battery housing adjacent to a first positive battery terminal, said positive battery channel socket configured as a mesa with a nonlinear channel forming a positive electrical contact open slot, and a negative battery channel socket (246) embossed on said battery housing adjacent to a first negative battery terminal, said negative battery channel socket configured as a mesa with a linear channel forming a negative electrical contact open slot;

a battery jumper plug cable (220), said battery jumper plug cable including a positive insulated electrical conductor and a negative insulated electrical conductor, said positive insulated electrical conductor having a first positive electrical jumper plug attached to a first positive electrical conductor end and a second positive electrical jumper plug attached to a second positive electrical conductor end, said negative insulated electrical conductor having a first negative electrical jumper plug attached to a first negative electrical conductor end and a second negative electrical jumper plug attached to a second negative electrical conductor end, said first positive electrical jumper plug having a first positive electrical prong configured for insertion into said positive electrical contact open slot, said first negative electrical jumper plug having a first negative electrical prong configured for insertion into said negative electrical contact open slot;

a positive battery lug socket (402), said positive battery lug socket including a positive battery socket shell with a positive socket shell opening extending into said positive battery socket shell, said positive battery lug socket also having a positive electrically conductive lead configured to electrically contact a conventional automotive positive battery terminal, said positive electrically conductive lead secured in said positive socket shell opening to form a positive battery lug electrical contact slot; and, a negative battery lug socket (408), said negative battery lug socket including a negative battery socket shell with a negative socket shell opening extending into said negative battery socket shell, said negative battery lug socket also having a negative electrically conductive lead configured to electrically contact a conventional automotive negative battery terminal, said negative electrically conductive lead secured in said negative socket shell opening to form a negative battery lug electrical contact slot;

whereby, insertion of said first positive electrical jumper plug into said positive electrical contact open slot, insertion of said first negative electrical jumper plug into said negative electrical contact open slot, insertion of said second positive electrical jumper plug into said positive battery lug electrical contact slot, and insertion of said second negative electrical jumper plug into said negative battery lug electrical contact slot function to electrically connect the source battery with the conventional automotive battery for conducting the charging operation.

7. The jump starting system of claim 6 wherein said first positive electrical jumper plug comprises an electrically nonconductive jumper plug grip, said first positive electrical prong fixed to said jumper plug grip, and said first positive electrical prong further connected to said positive insulated electrical conductor inside said jumper plug grip.

8. The jump starting system of claim 6 wherein said first positive electrical prong comprises an electrically conductive material.

9. The jump starting system of claim 6 wherein said first positive electrical prong (122) comprises a substantially planar component having a substantially rectangular cross section.

10. The jump starting system of claim 9 wherein said first positive electrical prong further comprises a first positive prong leading edge with at least one rounded prong corner on said first positive prong leading edge.

11. The jump starting system of claim 6 wherein said first positive electrical prong (182) comprises a first curved prong blade and an opposed second curved prong blade.

12. The jump starting system of claim 6 wherein said first positive electrical prong comprises a curved prong blade and an opposed planar prong blade.

13. The jump starting system of claim 6 wherein said first positive electrical jumper plug (448) comprises an electrical prong (462) oriented perpendicularly to said nonconducting plug grip and a grip jaw (466) extending from an end of said plug grip.

14. The jump starting system of claim 6 wherein said first positive electrical jumper plug (190) comprises an electrically nonconductive jumper plug grip, a fixed electrical conductor inside said jumper plug grip, and said first positive electrical prong, said first positive electrical prong longitudinally retractable into said jumper plug grip, said fixed electrical conductor further being connected to said positive insulated electrical conductor and maintaining continuous electrical contact with said first positive electrical prong.

15. The jump starting system of claim 6 wherein said second positive electrical jumper plug (210) comprises a jumper plug grip and a swivel electrical prong rotatably secured to a swivel pin, said swivel pin fixed to said jumper plug grip so as to allow said swivel electrical prong to be laterally rotated within a corner slot in said jumper plug grip.

16. A jump starting system suitable for use with two conventional automotive batteries in conducting a charging operation, said jump starting system comprising:
a battery jumper plug cable (270), said battery jumper plug cable including a positive insulated electrical conductor and a negative insulated electrical conductor, said positive insulated electrical conductor having a first dual prong jumper plug (275) electrically connected to a first positive conductor end and a second dual prong jumper plug (275) electrically connected to a second positive conductor end, said negative insulated electrical conductor having said first dual prong jumper plug (275) electrically connected to a first negative conductor end and said second dual prong jumper plug electrically connected to a second negative conductor end;
a battery transverse clamp (367), said battery transverse clamp for electrically contacting both a positive battery terminal and a negative battery terminal on a first conventional automotive battery (360), said battery transverse clamp including a first positive electrical contact opening (366) providing access to a positive electrical conductive path to the positive battery terminal, said battery transverse clamp further including a first negative electrical contact opening (368) providing access to a negative electrical conductive path to the negative battery terminal; and
a battery clamp (350), said battery clamp having a positive terminal contact pad (356) configured to make electrical contact with a positive automotive battery clamp on a second conventional automotive battery (370), said battery clamp further including a battery clamp electrical receptacle (353) with a second positive electrical contact opening, said second positive electrical contact opening providing an electrical conductive path to said positive terminal contact pad, said battery clamp also having a negative terminal contact pad (358) configured to make electrical contact with a negative automotive battery clamp on the second conventional automotive battery, said battery clamp electrical receptacle further including a second negative electrical contact opening providing an electrical conductive path to said negative terminal contact pad;
whereby insertion of said first dual prong jumper plug into said battery transverse clamp, and insertion of said second dual prong jumper plug into said battery clamp electrical receptacle function to electrically connect the first conventional automotive battery with the second conventional automotive battery for conducting the charging operation.

17. The jump starting system of claim 16 wherein said first dual prong jumper plug comprises a positive electrical prong electrically connected to said positive insulated electrical conductor.

18. The jump starting system of claim 16 wherein said first dual prong jumper plug (275) comprises a first electrically nonconductive grip (274) having a joint tail (314), and a second electrically nonconductive grip (272) having a joint groove (312), such that insertion of said joint tail into said joint groove forms a dovetail joint (310) and functions to removably attach said first electrically nonconductive grip to said second electrically nonconductive grip.

19. The jump starting system of claim 16 wherein said first dual prong jumper plug (320) comprises a first electrically nonconductive grip (322) with a magnetic strip, and a second electrically nonconductive grip (324) with a metal strip, such that placement of said metal strip against said magnetic strip functions to removably attach said first electrically nonconductive grip to said second electrically nonconductive grip.

20. The jump starting system of claim 16 wherein said first dual prong jumper plug (330) includes a first electrically nonconductive grip (332) with a hook strip, and a second electrically nonconductive grip (334) with a pile strip, such that placement of said pile strip against said hook strip functions to removably attach said first electrically nonconductive grip to said second electrically nonconductive grip.

* * * * *